June 15, 1926. 1,588,913
T. SHIPLEY
METHOD OF AND APPARATUS FOR FEEDING PRECOOLED WATER TO ICE PLANTS
Filed April 18, 1923
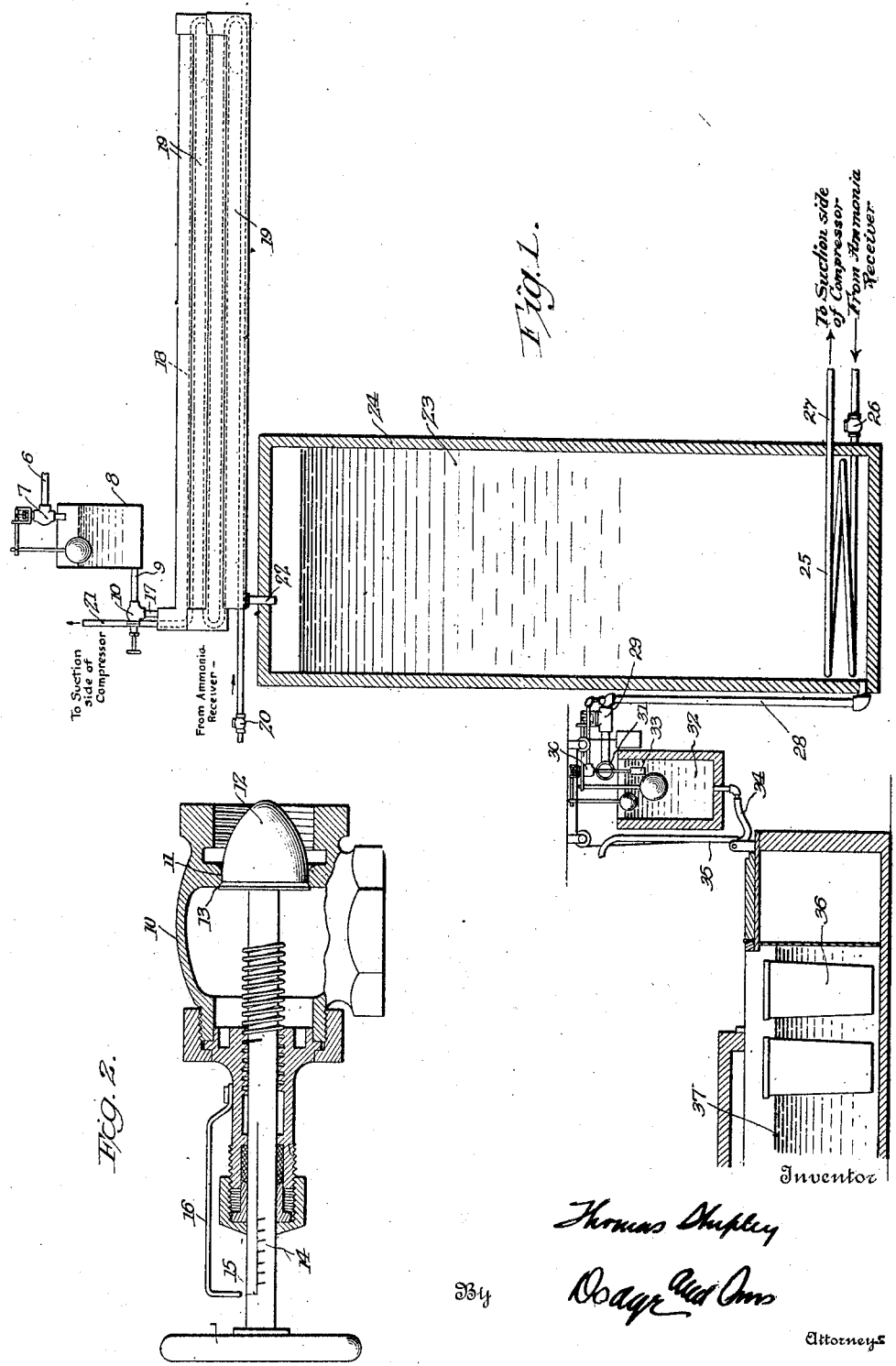

Patented June 15, 1926.

1,588,913

UNITED STATES PATENT OFFICE.

THOMAS SHIPLEY, OF YORK, PENNSYLVANIA.

METHOD OF AND APPARATUS FOR FEEDING PRECOOLED WATER TO ICE PLANTS.

Application filed April 18, 1923. Serial No. 633,022.

This invention relates to a method of and apparatus for steadying the load upon the refrigerating units forming part of a can ice plant.

The object of the invention is to provide a system applicable to plants of conventional types and serving to increase their over-all efficiency.

Heretofore, it has been the practice in can ice plants to feed the water through a pre-cooler to the can filler, the rate of flow being dependent on the filling operation. If the empty cans are filled and the frozen cans are dumped with regularity, a plant of this kind can be operated efficiently, but, under ordinary circumstances, it is impossible so to operate it. Various circumstances, including the occurrence of meal hours, changes of shift and so on, lead to substantial suspensions in the can-filling operation with intervening periods of more than average activity. The refrigerating unit which abstracts heat from the pre-cooler is consequently subjected to an intermittent or variable load and cannot operate at its best efficiency.

As a secondary effect, the water delivered by the pre-cooler is not at a constant temperature. After a period of sustained filling which tends to overload the pre-cooler, the temperature of the water delivered by the pre-cooler will rise considerably and this rise of temperature results in an increased load on the refrigerating unit which chills the brine tank. Consequently, the effect of variations in the can-filling rate is cumulative and results in a varying load on the entire plant. This is undesirable, first, because it lowers the efficiency and, second, because it increases the necessity for supervision, and the possibility of damage to the compressors.

In the system forming the subject matter of this application, the water supply is adjusted to have a constant rate of flow equal to the average or mean demand of the ice plant. The apparatus includes means by which this flow rate may be directly adjusted, and the adjustment be indicated on a graduated scale in terms for example of the quantity of water delivered per hour. The water flowing at this constant rate will, under ordinary circumstances, be at a substantially constant temperature, as most water supplies are subject only to seasonal variations in temperature.

Since the water arrives at a definite flow rate and at a definite temperature, it can be chilled to a constant or substantially constant delivery temperature by refrigerating means acting at a constant rate. By so arranging the parts, the load on the pre-cooling element is made uniform.

To meet seasonal changes in the water temperature, or changes in the desired output of the plant, or both, it is contemplated that the rate of flow and the refrigerating effect will be subject to independent adjustment, and thus susceptible of proper coordination.

To provide for fluctuations in the rate of filling cans, I provide a chilled water reservoir of sufficient capacity to take care of peak demands for water, and thus assure an adequate supply for the most sustained can-filling likely to occur, without the necessity of increasing the flow rate to the reservoir. This reservoir is ordinarily protected against the absorption of heat by insulation, but when the pre-cooling coils are not mounted in the reservoir it will be found desirable for best effect to provide small auxiliary cooling coils in the reservoir to abstract heat at a constant rate, to balance the heat leakage.

I prefer to locate the pre-cooler in the path of water flowing to the reservoir, rather than in the reservoir itself, but pre-coolers of the latter type are known and might be used successfully, and their possible use is contemplated.

Whether the pre-cooler and the storage reservoir are entirely distinct or whether they are more less merged into a single structure, the essential things are uniform inflow and sufficient storage capacity to meet peak demands. The concurrence of these conditions insures a constant load on the pre-cooler and a constant discharge temperature of water passing from storage. This discharge temperature should be just above freezing.

Under these conditions, the ordinary variations due to changes in the rate of filling cans involve relatively unimportant variations in load on the refrigerating plant, for the reason that, since the water reaches the can only slightly above the freezing temperature, the chief work done by the freezing tank is to abstract the latent heat of fusion given up by the forming ice. In other words, the operation of the plant under the system just outlined is to make uniform the rate of heat abstraction which reduces the temperature of the water from supply temperature substantially to the freezing point. Consequently, practically the entire variation in load is confined to the work of abstracting the latent heat of fusion from the forming ice, and is thus minimized.

The invention will now be described in connection with the preferred apparatus illustrated in the accompanying drawing.

In the drawing:

Fig. 1 is a vertical section showing a water feed, pre-cooler, storage tank, can filler, and a portion of a brine tank and a few ice cans arranged according to the present invention. Certain parts not material to the present invention are omitted so that the showing is partly diagrammatic.

Fig. 2 is an axial section through the preferred form of water feed control valve.

The water supply pipe is shown at 6 and is controlled by a float valve 7 which discharges into the constant head tank 8. The discharge connection 9 leads to the water feed control valve 10 whose maximum rate of flow under the head in tank 8 is preferably considerably less than the maximum rate of flow through pipe 6 and float valve 7 so that the float valve 7 functions under all adjustments of valve 10 to maintain a substantially constant static head on that valve. This is important because the maintenance of constant flow through valve 10, in any adjustment thereof, is dependent on the maintenance of constant head thereon.

While various types of valve might be substituted for the special type of valve 10 about to be described, most commercial valves do not give uniform flow rates at small openings, and the flow rate is not even approximately proportional to the amount the valve is opened. The special valve 10 is in its general aspects a globe valve with a special seat 11 and special valve member 12 so coordinated therewith that the rate of flow through the valve is proportional to the displacement of the valve member 12 from closed position.

The seat 11 is formed to provide a somewhat elongated passage and the valve member 12 has a special longitudinal section derived by experiment but approximating a parabola. Various specifically different forms might be derived all involving a paraboloid type of valve member and the elongated passage. Final closure of the valve is effected by a beveled flange 13 on valve member 12 which engages a beveled face on the exit side of the seat 11. The stem 14 of the valve 10 is graduated as shown at 15 and these graduations are read against an index 16. The graduations 15 indicate the rate of flow through the valve and the valve setting controls directly the rate of ice production of the entire plant.

The water discharged by valve 10 passes through pipe 17 to a pre-cooler consisting generally of a zigzag expansion coil 18 or a plurality of such coils, side by side, and a series of reversely arranged water troughs 19. These troughs are so arranged that each discharges into the trough next below and the water flowing back and forth in successive troughs submerges the successive passes of the expansion coil or coils 18. Liquid ammonia (or other suitable refrigerant) is fed through the expansion valve 20 to the lower end of coil (or coils) 18 and is discharged to the suction side of the compressor at 21. Hence the water and refrigerant gas flow in opposite directions causing the device to operate on the counterflow principle.

The above type of heat exchanger, together with certain structural features not material to the present invention and hence not discussed herein, forms the subject matter of a companion application, Serial No. 633,023, filed April 18, 1923. Consequently, no claim drawn broadly to this construction is presented herein. Other types of precooler, including double pipe counterflow coolers might be used in the practice of the present invention, but I prefer that shown because of its simplicity and efficiency.

The lowermost trough 19 discharges through a pipe 22 into a storage tank 23 whose capacity is sufficient to meet the peak demands for water, and thus permit a constantly flowing average water supply to meet a widely variable demand for water for can filling. The tank 23 is heavily insulated as shown at 24, and is provided with a cooling coil 25 to compensate for heat leakage. The coil 25 is an ordinary expansion coil fed through an expansion valve 26 and discharging to the suction side of the compressor at 27.

The pipe 28 which draws water from tank 23 is so arranged that a substantial quantity of water is below the level drained thereby. Pipe 28 might lead to any can filler or plurality of can fillers, but I have chosen for illustration the multiple measuring can filler described and claimed in my Patent No. 1,482,158, granted January 29, 1924. In this construction, water from pipe 28 passes through main float valve 29 and a smaller bypass float valve 30 to header 31 which in turn discharges into a series of alined measuring chambers 32, through equalizing siphon nipples 33. The floats of valves 29 and 30 are in one of the chambers 32 and are so arranged that the large valve 29 closes first and the smaller or bypass valve 30 gives the final or close feed to the measuring chambers. When the measuring chamber or chambers 32 are filled and their levels equalized by the siphon action through the nipples and header, the water may be drawn off from them through corresponding hose 34 carried in counterweighted hinged guide pipes 35, by swinging these down so that the hose discharge into a corresponding series of ice cans 36.

The cans 36 are surrounded by the brine in the chill tank 37 and this brine is maintained at the proper temperature by an expansion cooler of any suitable type (not shown in the drawing). This arrangement permits a large number of cans to be filled at once with a minimum of labor, and hence in some degree assists in securing a more even rate of can filling than can be had where cans are filled one at a time.

In operating a plant of this type, the valve 10 is adjusted to give the desired rate of water flow and the expansion valve 20 is adjusted to give a constant refrigerating effect which under the existing conditions (the temperature of the incoming water is the chief factor) will cause the pre-cooler to discharge water at the desired temperature, slightly above 32° F. into the tank 23. The expansion valve 26 is so adjusted as to compensate for heat leakage to the water in tank 23. These adjustments when correctly made are relatively permanent, but of course must be modified occasionally to meet seasonal changes in the temperature of water and air in the demand for ice.

When these adjustments are made the total refrigerating load on coils 18 and 25 is virtually constant and the water entering cans 36 is at a virtually constant temperature. By adopting a constant rate of can filling the entire load on the plant may be kept constant, but a variation in the rate of can filling, is permissible within ordinary limits because the only variable load is that placed on the evaporator which chills the brine in the chill tank and such variation is limited practically to that range in the freezing cycle in which the latent heat of fusion is abstracted from the forming ice.

The effect is to stabilize the load by abstracting the heat of the liquid at a constant rate, down to the point at which ice is about to form. Variations of load on the pre-cooler are immediately felt by the compressor, while ordinary variations of load on the main freezing tank are not felt by the compressor so quickly nor so severely because the large heat storage capacity of the brine necessarily exerts a steadying effect. Thus the elimination of load variations in the pre-cooler conduces to a steady load on the compressor in a much greater degree than might be supposed on casual consideration.

Not only does this steady the load on the entire plant, but it confines the variations to one expansion cooler, that in the brine tank, so that observation and regulation are performed with comparative ease.

Obviously the apparatus is subject to variation in detail. Various constant flow water feeding devices might be used, and various pre-cooling and reservoir arrangements. While, as stated, I prefer to separate the pre-cooler and the reservoir, so that the pre-cooler acts on the water as it flows to the reservoir, this separation is not essential, provided a constant water feed can be pre-cooled, and provided adequate storage capacity is afforded.

What is claimed is:

1. The method of producing ice which consists in drawing from a stored volume of water pre-cooled approximately to the freezing point batches of water permissibly varying in volume, but each substantially smaller than the stored volume; freezing the water so drawn; and maintaining the supply and temperature of the stored water by progressively adding water supplied at a substantially uniform initial temperature and rate and progressively withdrawing heat from such water at a substantially uniform rate.

2. The method of supplying pre-cooled water to ice plants, which consists in feeding water at the temperature of supply at a substantially constant rate corresponding to the desired rate of ice production, to a cooling device operated at a substantially constant rate corresponding to the rate of water flow and the temperature of water supply to pre-cool such water substantially to the freezing point; storing the pre-cooled water in sufficient quantity to meet the peak demands therefor; and drawing water to be frozen from the water so stored.

3. The method of supplying pre-cooled water to ice plants, which consists in feeding water at the temperature of supply at a substantially constant rate corresponding to the desired rate of ice production, through a cooling device operated at a substantially constant rate corresponding to the rate of water flow and the temperature of water supply; storing the water passing from the pre-cooler in sufficient quantity to meet the peak demands for pre-cooled water; maintaining the temperature of the stored water by abstracting heat therefrom at a rate commensurate with the heat leakage thereto; and drawing water to be frozen from the water so stored.

4. The method of steadying the load on refrigerating units used in can ice plants which consists in storing a reserve of cooled water at constant temperature and in volume sufficient to meet the peak demands for can filling purposes; filling the cans from the water so stored; and replenishing said reserve of cooled water by progressively adding water at a uniform rate and abstracting heat by the action of said refrigerating unit from such water at a uniform rate determined according to the rate of flow, the temperature of supply, and the desired temperature of storage.

5. The method of minimizing the refrigeration load variations on can ice plants arising from variations in the rates of can-filling, which consists in pre-cooling nearly to the freezing point a stream of water flowing at a uniform quantity rate commensurate with the desired average ice output; storing said pre-cooled water in sufficient quantity to supply solely from the water in storage the varying demand for can-filling; maintaining the reduced temperature of the stored water; and filling the cans from the water so stored, the operations being so coordinated that the load due to reducing the heat of the liquid is maintained substantially constant regardless of the rate of can-filling, the load variation on the plant as a whole being confined to the obstruction of the latent heat of fusion of the forming ice.

6. The method of producing ice, which consists in providing a supply of water flowing at a substantially constant rate and at a substantially constant temperature; abstracting heat from said flowing water at a substantially constant rate sufficient to reduce its temperature nearly to the freezing point; and thereafter in a second operation subjecting said pre-cooled water in batches of permissibly variable quantity to further reduction of temperature to freeze the same.

7. In a water feed for ice plants, the combination of a water supplying means arranged to have a constant flow rate; a pre-cooler fed thereby; a storage tank arranged to accumulate cooled water from said pre-cooler in quantity sufficient to compensate for variations in the demand for water for can filling; means for maintaining the reduced temperature of water stored in said tank; and can filling means fed from said tank.

8. In a water feed for ice plants, a supply chamber; means for maintaining a constant static head in said chamber; a flow regulating discharge passage leading from said chamber; a precooler fed by said discharge passage and operable to exert a uniform cooling effect on water flowing therethrough; a reservoir fed by said precooler arranged to accumulate water in a quantity sufficient to compensate for variations in the demand for water for can filling; and can filling means fed from said reservoir.

9. In a water feed for ice plants; a reservoir; means for maintaining a constant static head in said reservoir; a discharge passage leading from said reservoir; a precooler fed by water from said passage and operable to exert a definite cooling effect on said water; a storage tank arranged to accumulate cooled water from said precooler in quantity sufficient to compensate for variations in the demand for water for can filling; means for maintaining the reduced temperature of water stored in said tank; and independent means for adjusting the effective area of said passage and the cooling rate of said pre-cooler.

10. In a water feed for ice plants, a supply chamber; means for maintaining a constant static head in said chamber; a discharge passage leading from said chamber; a precooler fed by said passage and constructed and arranged to abstract heat at a constant rate from water flowing therethrough; a storage reservoir fed by said precooler and of sufficient volume to accumulate water in a sufficient quantity to compensate for variations in the demand for water for can filling; can filling means fed from said reservoir; and independently adjustable means for varying the effective area of said passage and for varying the rate of heat abstraction by said precooler.

11. In a water feed for ice plants, the combination of a reservoir; means for maintaining a constant static head in said reservoir; a valve controlling the discharge therefrom and arranged to have under said constant head a flow rate which varies substantially in direct proportion to the adjusting movement of the valve; a pre-cooler and storage tank fed by said valve; and intermittently operable can filling means fed from said tank In testimony whereof I have signed my name to this specification.

THOMAS SHIPLEY.